US012615308B1

(12) United States Patent
Furnish et al.

(10) Patent No.: US 12,615,308 B1
(45) Date of Patent: Apr. 28, 2026

(54) APPLICATION-LEVEL DATA TRANSPORTATION IN DISTRIBUTED COMPUTING SYSTEM

(71) Applicant: Cadence Design Systems, Inc., San Jose, CA (US)

(72) Inventors: Geoffrey Mark Furnish, Austin, TX (US); William S. Lear, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 59 days.

(21) Appl. No.: 18/951,423

(22) Filed: Nov. 18, 2024

(51) Int. Cl.
　　*H04L 67/06* 　　　(2022.01)
　　*H04L 69/22* 　　　(2022.01)
(52) U.S. Cl.
　　CPC .............. *H04L 67/06* (2013.01); *H04L 69/22* (2013.01)
(58) Field of Classification Search
　　CPC ................................. H04L 67/06; H04L 69/22
　　See application file for complete search history.

(56) References Cited

U.S. PATENT DOCUMENTS

| | | | |
|---|---|---|---|
| 2003/0009530 A1* | 1/2003 | Philonenko ......... | H04M 3/5183 709/206 |
| 2003/0014624 A1* | 1/2003 | Maturana ............ | H04L 63/0281 713/151 |
| 2018/0102996 A1* | 4/2018 | Bachmann ............ | H04L 67/562 |
| 2020/0334170 A1* | 10/2020 | Ji ........................... | G06F 3/0604 |
| 2021/0218631 A1* | 7/2021 | Bugenhagen ....... | H04L 12/2854 |
| 2024/0406137 A1* | 12/2024 | Gero ................... | H04L 63/0209 |

* cited by examiner

*Primary Examiner* — Benjamin M Thieu
(74) *Attorney, Agent, or Firm* — Schwegman Lundberg & Woessner, P.A.

(57) ABSTRACT

Various embodiments provide for application-level data transportation in a distributed computing system. In particular, various embodiments described herein provide application-level protocol, encoding, and decoding methodologies for data transport via application-level messages, which can be implemented by a distributed software application operated on a distributed computing system.

20 Claims, 5 Drawing Sheets

─ 200

202 ─ FIRST SOFTWARE AGENT ESTABLISHES NETWORK CONNECTION WITH SECOND SOFTWARE AGENT

204 ─ FIRST SOFTWARE AGENT GENERATES INDIVIDUAL FIRST SOFTWARE AGENT-TO-SECOND SOFTWARE AGENT MESSAGE

206 ─ FIRST SOFTWARE AGENT SENDS INDIVIDUAL FIRST SOFTWARE AGENT-TO-SECOND SOFTWARE AGENT MESSAGE FROM FIRST SOFTWARE AGENT TO SECOND SOFTWARE AGENT OVER THE NETWORK CONNECTION

208 ─ FIRST SOFTWARE AGENT RECEIVES, FROM SECOND SOFTWARE AGENT, INDIVIDUAL RECEIPT MESSAGE FOR INDIVIDUAL FIRST SOFTWARE AGENT-TO-SECOND SOFTWARE AGENT MESSAGE

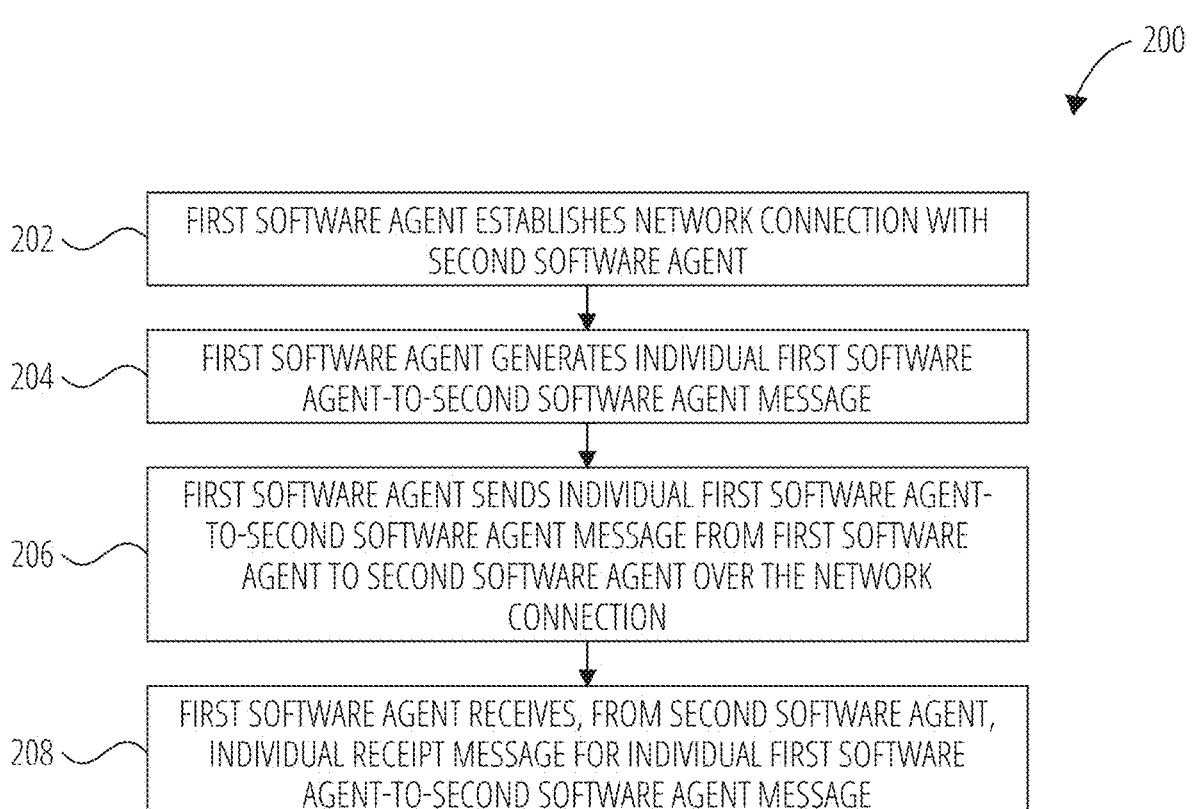

202 FIRST SOFTWARE AGENT ESTABLISHES NETWORK CONNECTION WITH SECOND SOFTWARE AGENT

204 FIRST SOFTWARE AGENT GENERATES INDIVIDUAL FIRST SOFTWARE AGENT-TO-SECOND SOFTWARE AGENT MESSAGE

206 FIRST SOFTWARE AGENT SENDS INDIVIDUAL FIRST SOFTWARE AGENT-TO-SECOND SOFTWARE AGENT MESSAGE FROM FIRST SOFTWARE AGENT TO SECOND SOFTWARE AGENT OVER THE NETWORK CONNECTION

208 FIRST SOFTWARE AGENT RECEIVES, FROM SECOND SOFTWARE AGENT, INDIVIDUAL RECEIPT MESSAGE FOR INDIVIDUAL FIRST SOFTWARE AGENT-TO-SECOND SOFTWARE AGENT MESSAGE

FIG. 2

APPLICATION-LEVEL DATA TRANSPORTATION IN DISTRIBUTED COMPUTING SYSTEM

TECHNICAL FIELD

Embodiments described herein relate to data communications and, more particularly, to systems, methods, devices, and instructions for application-level data transportation in a distributed computing system.

BACKGROUND

Modern data centers consist of tens of thousands of individual servers, each containing multiple processor cores (hereafter also referred to as cores). The number of cores per server has been steadily increasing. These data centers are used to run large numbers of computational jobs submitted by users, such as jobs relating to circuit designs (e.g., jobs performed by electronic design automation (EDA) software systems).

BRIEF DESCRIPTION OF THE DRAWINGS

Various appended drawings merely illustrate some embodiments of the present disclosure and should not be considered as limiting its scope. In the drawings, which are not necessarily drawn to scale, like numerals may describe similar components in different views. To easily identify the discussion of any particular element or act, the most significant digit or digits in a reference number refer to the figure number in which that element is first introduced.

FIG. 2 and FIG. 3 are flowcharts illustrating example methods for application-level data transportation in a distributed computing system, according to some embodiments.

DETAILED DESCRIPTION

Figure 1:
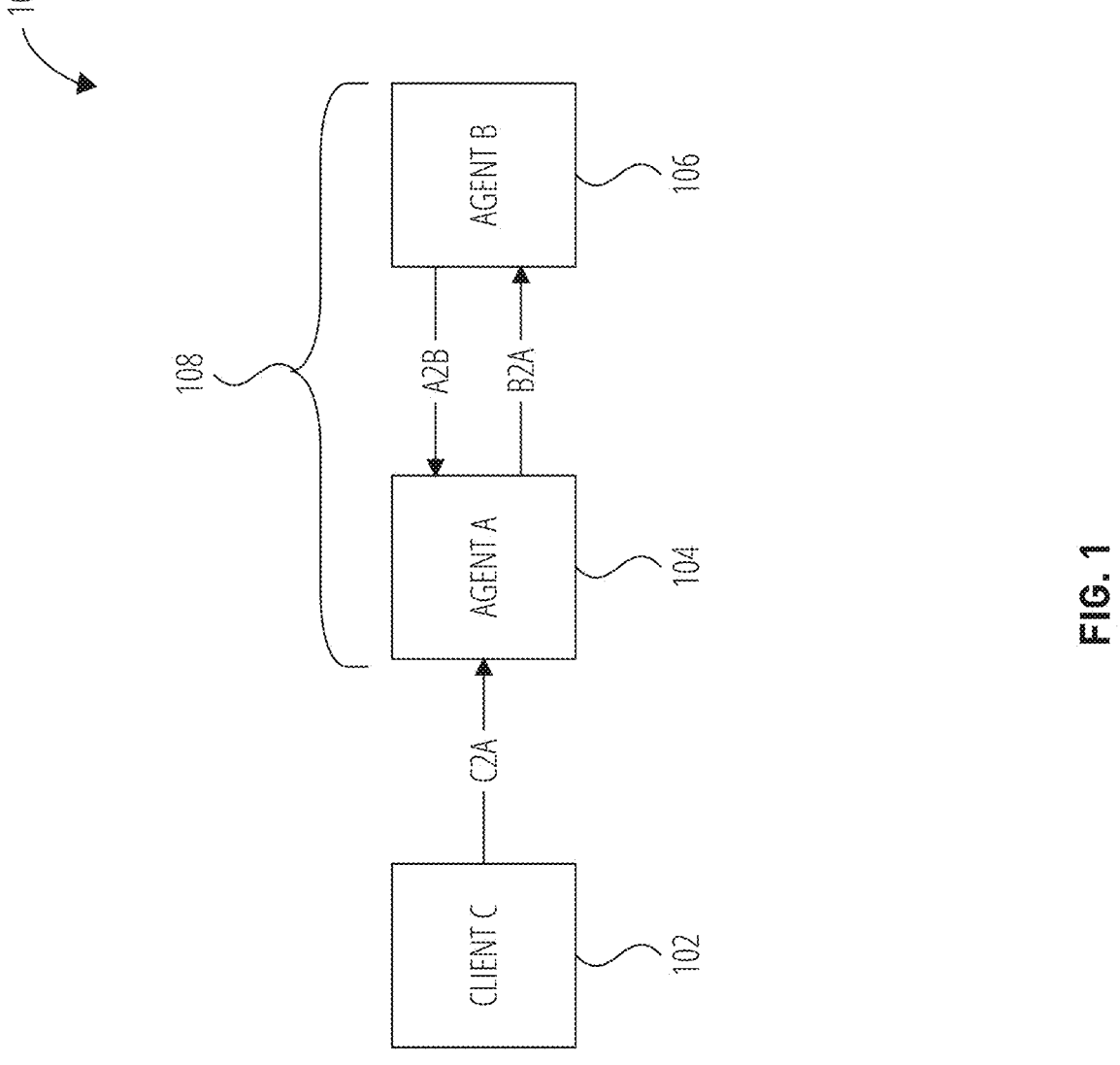
FIG. 1 is a diagram illustrating an example distributed computing system implementing application-level data transport, according to some embodiments.

As used herein, a distributed software application can refer to a software application that runs on multiple interconnected nodes (e.g., each implemented by a virtual or physical computational machine) in a network, with different components of the application executing on separate nodes while coordinating their activities through message passing to achieve a common goal. As used herein, a distributed computing system can comprise a collection of independent nodes (e.g., each implemented by a virtual or physical computational machine) connected by a network, where the nodes can work together to execute a software application (e.g., distributed software application) by sharing resources, coordinating tasks, and communicating information (e.g., messages) via network protocols such as Transmission Control Protocol/Internet Protocol (TCP/IP) sockets to solve large-scale computational problems efficiently.

To efficiently utilize the computational resources in a data center, batch systems are often employed to control and coordinate job execution across the many available servers and cores. A batch system represents an example of a distributed software application operating on a distributed computing system. Batch systems typically use a machine (e.g., virtual or physical computational machine) to be designated as a control node, which distributes job execution requests out to other machines (e.g., virtual or physical computational machine) designated as compute nodes (e.g., compute servers) for execution. As used herein, a node can refer to a machine (e.g., physical or virtual computational machine) within a distributed (computing) system that can process data, execute tasks, and communicate with other nodes. A distributed computing system implementing a batch system can comprise one or more control nodes, and communication between the control nodes (of a distributed system) and a client system (e.g., client machine) submitting one or more jobs is usually accomplished through network protocol, such as TCP/IP sockets. The network communication enables the coordination of job submission, execution, monitoring, and results collection across the distributed system.

As data centers have grown larger, with hundreds of thousands of cores becoming common, the demands on batch systems have increased significantly. A key performance metric for batch systems is the rate at which they can dispatch jobs to keep the compute resources fully utilized. In some computer environments, job run time can average around 2.5 minutes, where a 200,000-core data center may see jobs completing at a rate of over 600 Hz.

Conventional batch systems face challenges in scaling to meet the demands of very large data centers. For example, some systems are only able to control a subset of the total cores, requiring the data center to be divided into smaller segments, which can lead to inefficient resource utilization, with some segments having queued jobs while others have idle cores. The performance of batch control can depend heavily on their ability to rapidly transmit and process messages between the various components of the distributed computing system. This includes job submission requests from clients, dispatch instructions to compute nodes, status updates, and results collection. The volume of message traffic handled has increased dramatically as data centers have grown.

Overall throughput of distributed computing systems (e.g., in data centers) is not only a function of the machine inventory, but also the speed with which the various control nodes can move messages across the network (whether on-host or cross-host) in order to support scheduling decisions at a rate sufficient to keep the inventory of machines busy. As such, maximizing the bandwidth and minimizing the latency of message transport is of concern in the construction of software to control data centers. Conventional approaches to network communication in distributed computing systems often use bidirectional TCP sockets for all messages passing between components. While TCP provides reliable delivery of messages at the operating system level (e.g., where an operating system ensures it delivers messages from one endpoint to the other of a connected socket, or returns an error message in the case of failure), additional application-level protocols are typically needed to ensure proper message sequencing, acknowledgment, and error handling in complex distributed software applications. Generally, where a software application on a distributed computing system is responsible for coordinating and orchestrating the execution of millions of jobs per day, participating agents in the distributed computing system need to have a clear indication of receipt of transmissions by the peer on the other end of a channel. For example, if an error occurs during message transmission (as seen by the application level, irrespective of what the operating system may deem a successful transmission), then the sending agent should retain the message in the outgoing message queue, and re-transmit after the link is restored to proper operation (or perhaps take other appropriate application-specific responsive action). Additionally, common methods for encoding messages in distributed computing systems include formats like JSON (JavaScript Object Notation), CBOR (Concise Binary Object Representation), protobuf (protocol buffers), Cap'n Proto, and other serialization formats. These approaches generally involve transforming data structures into a standardized format, and use string encoding. While flexible, such encoding methods can add processing overhead.

Various embodiments described herein provide for application-level data transportation in a distributed computing system, which can assist with high-performance data transport in the distributed computing system and assist with operating a distributed software application on heterogeneous computing machines of the distributed computing system. In particular, various embodiments described herein provide application-level protocol, encoding, and decoding methodologies for data transport via application-level messages, which can be implemented by a distributed software application operated on a distributed computing system. As used herein, an application-level message can refer to a message sent and received at an application layer of a software architecture (e.g., program stack) of a distributed software application. An application-level message is distinct from a message exchanged at a network layer, which may be used to carry an application-level message. Use of various embodiments can enable efficient coordination of job execution, maximize network communication performance, efficient encoding and decoding of application-level messages, efficient coordination of activities (e.g., job execution) across simultaneous network connections, or some combination thereof. According to some embodiments, a distributed computing system comprises two or more agents (e.g., agent instances), where each individual agent is associated with (e.g., has) a class that describes the individual agent's function, behavior, or both for the distributed software application operating on the distributed computing system. An individual agent (also referred to herein as an individual software agent) can be implemented as a program or process running on a separate node of a distributed computing system. For some embodiments, based on the agent classes of software agents in the distributed computing system, each communicating pair of agent classes (e.g., agent class of source software agent) within the distributed computing system exchange application-level messages over an application-level channel (hereafter also referred to as a channel) specifically associated with the agent class pair.

For example, consider where a first software agent of a distributed computing system is associated with a batch scheduler agent class (indicating that the first software agent serves as a batch scheduler for a batch software application operating on a distributed computing system), and a second software agent of the distributed computing system is associated with a job controller agent class (indicating that the second software agent serves as a job controller for the batch software application). The first software agent can batch scheduling information to the second software agent by way of a batch scheduler agent class-to-job controller agent class channel established between the first and second software agents (e.g., over a network socket connection), and the second software agent can send batch results to the first software agent by way of a job controller agent class-to-batch scheduler agent class channel established between the first and second software agents.

For some embodiments, a channel protocol (or protocol) is defined for a channel between different individual agent class pairs (e.g., each agent class pair can have a different defined protocol), where the protocol defines (e.g., specifies) a plurality (e.g., enumeration) of application-level message types that can be sent over the channel from one agent class to another agent class. Specific message identifiers (IDs) for different application-level message types can be identified within the protocol, where the specific IDs are relevant to one or more functions/behaviors associated with (e.g., implemented within) the distributed software application.

For various embodiments, an individual channel (between two agents) is bi-directional such that primary data (e.g., primary information) flows in one direction over the individual channel, and only acknowledgment data (e.g., acknowledgments to the primary information) flows in the opposite direction over the individual channel. For example, with respect to a first agent and a second agent, a first channel can enable primary data flow to flow from the first agent to the second agent over the first channel and acknowledgments (e.g., application-level acks) to flow from the second agent to the first agent over the first channel, while a separate, second channel can enable primary data flow to flow from the second agent to the first agent over the second channel and acknowledgments to flow from the first agent to the second agent over the second channel. Acknowledgment messages can comprise payload.

For some embodiments, the structure of an application-level message (e.g., for a specific distributed software application) comprises a message header and a payload for storing payload data, where the message header comprises a message identifier that identifies a message type of a channel protocol. In the application layer, the message header and payload of the application-level message can be separate data objects (e.g., not contiguous in memory). The message header of the given message can indicate whether the message header is storing a payload, can indicate the data length of payload to follow the message header, or both. The message header of various embodiments enable reads by a software agent receiving an application-level message to have a defined data size (e.g., every application-level message can start with a 16-byte read (sizeof(MessageHeader) ==16)), which can enable a receiving software agent to read in the message header (e.g., by performing a fixed-length read operation on a network read buffer) without need of searching for message header boundaries. Additionally, the application-level message structure of various embodiments enable payload reads to have a known data size (e.g., known byte count) based on information provided by the message header of the application-level message, which can enable a receiving software agent to pre-size the payload receipt buffer based on the reading the message header. If any read performed on a network transport buffer by the receiving software agent comes back short in view of the known data size of the payload data, the remaining read size can be exactly calculated by the receiving software agent, and a continuation read can be initiated by the receiving software agent based on the remaining read size. Further, the application-level message structure of various embodiments enable a receiving software agent to avoid syntactic entanglement. For example, a receiving software agent would not need prior knowledge of the payload encoding but, rather, the receiving software agent would simply read a message header (e.g., read the message header from a network transport read buffer using a fixed-length read operation based on a predetermined fixed-data size known and used by all software agents of the distributed software application), find the payload size from the message header, and read in payload data received over the channel based on the payload size (e.g., using one or more read operations based on the payload size to read payload data from the network transport read buffer). Subsequently, for a next application-level message, the receiving agent does not need to study the payload bytes as they come through, looking for matching closures, searching for message boundaries, etc. Rather, the message receiver would simply read a next message header of the next application-level message (e.g., read the next message header from the network transport read buffer using a fixed-length read operation based on the predetermined fixed-data size), find the next payload size from the next message header, and read in next payload data received over the channel based on the next payload size (e.g., using one or more read operations based on the next payload size to read next payload data from the network transport read buffer). Once an incoming application-level message has been reconstituted on the receiving agent (e.g., the payload data has been completely received), the incoming application-level message (e.g., the payload data therein) can be dispatched to an appropriate handler based on identifier in the message header, without need for "peering into" the message payload to search for semantic intent.

Hereafter, messages exchanged between software agents will be understood to be application-level messages (e.g., associated with one or more distributed software applications).

An example application-level message structure according to some embodiments is described in TABLE 1 below.

TABLE 1

| Message Structure | |
| --- | --- |
| Message Header<br>ID P1 P2 | Payload<br>Payload Data |
| ID field - message identifier for the message that can specify a message type of the message, where the message type can be selected from a list of message types defined by a protocol of a channel carrying the message.<br>P1 field - indicates the presence/absence of payload data within the message (e.g., P1 == 0 indicates no payload data within the message; P1 != 0 indicates payload data within the message).<br>P2 field - specifies data size (e.g., data length) of payload data carried by the message (if the message comprises payload data).<br>If P1 indicates no payload data within the message (e.g., P1 == 0), P2 can store data (limited to the data size/data type used for the P2 field).<br>If P1 indicates payload data within the message (e.g., P1 != 0), P2 holds value indicating data size of the payload data. | Payload is optional within the message. Payload data can comprise encoded data (e.g., encoded using an encoding function associated with message identifier). |

TABLE 2 below illustrates an example of a program definition (e.g., C++ definition) of an application-level message structure according to various embodiments.

TABLE 2

| Message Structure | struct Message { |
| |   typedef std::vector< char > MessageBody; |
| |   MessageHeader hdr; |
| |   MessageBody body; |
| |   // ... |
| |   template < typename ProtocolCommand, |
| |     typename BodyPayload > |
| |   Message( ProtocolCommand cmd, |
| |     const BodyPayload& payload ) |
| |   { |
| |     hdr.id = std::to_underlying( cmd ); |
| |     hdr.p1 = 1; |
| |     hdr.p2 = serialize( payload, body ); |
| |   } |
| |   // ... |
| | }; |
| Structure of Message Header within Message Structure | struct MessageHeader { |
| |   int id{0}; |
| |   p1{0}; |
| |   int64_t p2{0} |
| | }; |

For some embodiments, payload data included in a given message comprises application data of a distributed software application (e.g., a data structure of the distributed software application, such as a program variable or data object). In some embodiments, payload data of a given message comprises encoded application data generated by a sending software agent using an encoding (or encoder) function, which can encode the application data prior to the application data being included (or "incorporated") as payload data of the given message. The encoding function can comprise, for example, a serialization function such as the function serialize, the invocation of which is depicted in TABLE 2. Examples of encoding functions used by an embodiment can include, without limitation, a zpp-bits serialization function, a JSON serialization function, a CBOR serialization function, and a protobuf serialization function. Accordingly, for various embodiments, a receiving software agent supports a decoding (or decoder) function capable of decoding the encoded application data. As described herein, the receiving software agent can determine which decoding function to use to decode encoded application data from a received message based on a message identifier of the received message.

In terms of transport mechanics, a sending software agent of some embodiments sends a given message to a receiving software agent by the sending software agent: writing a message header of the given message (e.g., to a network write buffer on the sending software agent associated with a network socket connection established with the receiving software agent); then writing payload data of the given message (e.g., to the network write buffer); and then waiting for and receiving a receipt message from the receiving software agent for the given message (e.g., the sending software agent reads the receipt message from a network read buffer on the sending software agent associated with the network socket connection). A message header of the receiving message can indicate an acknowledgment message type, and the acknowledgment message type can be an acceptance acknowledgment or a rejection acknowledgment. When a receiving software agent of some embodiments receives a given message from a sending software agent, the receiving software agent: reads a message header of the given message (e.g., from a network read buffer on the receiving software agent associated with a network socket connection established with the sending software agent); and determines whether the given message includes payload data based on the message header (e.g., payload data is present if P1 field of the message header indicates that payload data is present and P2 field indicates a payload data size of greater than 0). In response to the presence of payload data in the given message, the receiving software agent can read payload data (e.g., from the network read buffer on the receiving software agent) based on the payload data size indicated in the message header. Additionally, in response to the presence of payload data in the given message, the receiving software agent attempts to decode the payload data, where the decode function used by the receiving software agent can be selected based on a message identifier of the message header of the given message. Thereafter, the receiving software agent can send a receipt message back to the sending software agent (e.g., over the network socket connection) as a response to the given message, where the receipt message can indicate a successful acknowledgment (e.g., acceptance acknowledgment type) to indicate a successful decode of the payload data or a failure acknowledgment (e.g., rejected acknowledgment type) to indicate an unsuccessful decode of the payload data.

According to some embodiments, an encoding function used by the sending software agent is configured to work whether the data is in most-significant-bit (MSB) byte order or least-significant-bit (LSB) byte order. In doing so, various embodiments can support heterogeneous machines in a distributed computing system that is operating a distributed software application. TABLE 3 below provides example programmatic definitions (e.g., C++ definition) for byte-order-agnostic serialization and deserialization functions based on zpp-bits. The example serialization function as shown in TABLE 3 is configured to accept any aggregate type directly, and avoids character encoding complexity. Additionally, the serialization and de serialization functions of TABLE 3 are configured to shuffle MSB/LSB when needed to provide big/little endian interoperability.

TABLE 3

```
#include "zpp_bits.h"
template < class T, class B >
std: size_t zpp_serialize( const T& t, B& data )
{
    zpp::bits::out out{ data,
        zpp::bits::endian::little { } };
    if ( auto result = out( t ); failure( result ) )
    {
        return 0;
    }
    return out.position( );
}
template < class T, class B >
std::size_t zpp_deserialize( T& t, const B& data )
{
    zpp::bits::in in{ data,
        zpp::bits::endian::little { } };
    if ( auto result = in( t ); failure( result ) )
    {
        return 0;
    }
    return in.position( );
}
```

Use of various embodiments can ensure that all reads performed on a network read buffer by a receiving software agent are of known data length. Use of various embodiments can enable a receiving software agent to size payload buffers after reading a message header, and to use a fixed-length read on the network read buffer. If a read comes up short, the receiving software agent can determine a continuation read length and initiate a continuation read on the network read buffer. Once a message (e.g., header plus payload data) has been fully read by the receiving software agent, the receiving software agent can directly invoke an appropriate message handler (e.g., based on message identifier in the message header). Known-length reads mean that software agents can receive payload data of an incoming message without requiring instructions (e.g., message hauling code) to incrementally syntactically analyze the incoming message as it comes across, to find the end of the incoming message (and the start of the next incoming message).

Reference will now be made in detail to various embodiments of the present disclosure, examples of which are illustrated in the appended drawings. The present disclosure may, however, be embodied in many different forms and should not be construed as being limited to the examples set forth herein.

FIG. 1 is a diagram illustrating an example distributed computing system 100 implementing application-level data transport, according to some embodiments. As shown, the distributed computing system 100 comprises a software agent C 102 (also referred to as agent C), software agent A 104 (also referred to as agent A), and a software agent B 106 (also referred to as agent B). While FIG. 1 illustrates the distributed computing system 100 including a single client software agent, the distributed computing system of various embodiments support more than a single client software agent. Additionally, while FIG. 1 illustrates the distributed computing system 100 with only two non-client software agents, the distributed computing system of various embodiments can support more than two non-client software agents.

For various embodiments, each software agent (e.g., 102, 104, 106) of the distributed computing system 100 is associated with at least one agent class that describes a function or a behavior of the software agent with respect to a distributed software application operating on the distributed computing system 100. In FIG. 1, software agent C 102 has an agent class C, which can represent a client of the distributed software application (e.g., batch software application), software agent A 104 has an agent class A, which can represent a first type of persistent service of the distributed software application (e.g., batch scheduler), and 106 has an agent class C, which can represent a second type of persistent service of the distributed software application (e.g., job controller). As described herein, software agent A 104, and software agent B 106 can operate on shared or separate physical machines, while the software agent C 102 can be on a separate physical machine.

In the distributed computing system 100, a bidirectional channel C2A is established between software agent C 102 and software agent A 104, with a primary direction of message flow from software agent C 102 (source) to software agent A 104 (destination), and a back-flow direction from software agent A 104 (destination) to software agent C 102 (source) to convey receipt messages for acknowledging messages received in the primary direction over C2A. A bidirectional channel A2B is established between software agent A 104 and software agent B 106, with a primary direction of message flow from software agent A 104 (source) to software agent B 106 (destination), and a back-flow direction from software agent B 106 (destination) to software agent A 104 (source) to convey receipt messages for acknowledging messages received in the primary direction over A2B. A bidirectional channel B2A is established between software agent A 104 and software agent B 106, with a primary direction of message flow from software agent B 106 (source) to 104 (destination), and a back-flow direction from software agent A 104 (destination) to software agent B 106 (source) to convey receipt messages for acknowledging messages received in the primary direction over B2A. According to some embodiments, if software agent A 104 needs to send application data to software agent B 106 (e.g., as part of its batch scheduler function) via an application-level message, software agent A 104 uses the A2B channel to send the application-level message with the application data (e.g., as encoded data) to software agent B 106, and to receive an application-level acknowledgment message back from software agent B 106 in response. If software agent B 106 needs to send application data (e.g., as part of its job control function) to agent A via an application-level message, the software agent B 106 uses the B2A channel to send the application-level message with the application data (e.g., as encoded data) to software agent A 104, and to receive an application-level acknowledgment message back from software agent A 104 in response. Similarly, if software agent C 102 (e.g., as a client) needs to send application data (e.g., job request) to software agent A 104 (e.g., as part of its batch scheduler function) via an application-level message, software agent C 102 uses the C2A channel to send the application-level message with the application data (e.g., as encoded data) to software agent A 104, and to receive an application-level acknowledgment message back from software agent A 104 in response. In this way, software agent C 102 as a client can use the C2A channel to make requests of the distributed computing system 100 via software agent A 104, and can receive return information (e.g., results of a requested batch job) as payload data of the application-level acknowledgment message received by software agent C 102 from software agent A 104. As a client, software agent C 102 can establish two or more channels to software agent A 104 if one channel is insufficient.

According to various embodiments, each individual channel between a source software agent and a destination software agent has a protocol, which specifies a set of message types that agents of an agent class of a source software agent can send to agents of an agent class of destination software agent over the channel. Additionally, for some embodiments, each pair of agent classes (source, destination) communication over a channel within the distributed computing system 100 has a protocol (e.g., each pair has its own protocol).

For illustrative purposes, the channels in FIG. 1 are named using a X2Y naming convention, where X and Y are the agent classes of the source and destination software agents (respectively), and the 2 shows the primary directionality of the channel (from the source software agent to the destination software agent). Accordingly, each of the channels A2B, B2A, and C2A has a defined protocol, which specifies a set of message types that agents of an agent class of a source software agent can send to agents of an agent class of destination software agent. A protocol for A2B (agent class A-to-agent class B) channel can specify message types that can be sent from a software agent of an agent class A (e.g., a batch scheduler) to a software agent of an agent class B (e.g., to a job controller). A protocol for B2A (agent class B-to-agent class A) channel can specify message types that can be sent from a software agent of an agent class B (e.g., to a job controller) to a software agent of an agent class A (e.g., to a batch scheduler). A protocol for C2A (agent class C-to-agent class A) channel can specify message types that can be sent from a software agent of an agent class C (e.g., to a client) to a software agent of an agent class A (e.g., to a batch scheduler). Depending on the embodiment, the distributed computing system 100 can comprise multiple software agents that have the same agent class (e.g., multiple software agents serving as clients, and multiple software agents serving as job controllers, etc.).

TABLE 4 below illustrates an example of a program definition (e.g., C++ definition) of an enumeration of message types for a A2B channel of distributed computing system 100.

TABLE 4

```
enum class A2B {
    Ack = 1,
    Initialize ,
    run_job ,
    suspend_job ,
    kill_job
} ;
```

In TABLE 4, a message of the Ack message type (with a message ID of 1) can be used by a receiving software agent (e.g., software agent B 106) to acknowledge receipt of any incoming message delivered over the channel A2B from a sending software agent (e.g., software agent A 104). A message of the Initialize message type (with a message ID of 2) may carry no payload data, but may be used by a sending software agent (e.g., software agent A 104) to bring the receiving software agent (e.g., 106) to a ready state. A message of the run_job message type (with a message ID of 3) can use payload data to convey information regarding a job the sending software agent (e.g., software agent A 104) wants the receiving software agent (e.g., software agent B 106) to run. Such information can include, without limitation, a user id, a group id, a command string, or an environment setting. A message of the suspend_job message type (with a message ID of 4) can use payload data (or the P2 field of the message header) to convey information regarding a job the sending software agent (e.g., software agent A 104) wants the receiving software agent (e.g., software agent B 106) to suspend. Similarly, a message of the kill_job message type (with a message ID of 5) can use payload data (or the P2 field of the message header) to convey information regarding a job the sending software agent (e.g., software agent A 104) wants the receiving software agent (e.g., software agent B 106) to kill. With respect to the suspend_job message type and the kill_job message type, the information conveyed can simply comprise a target job identifier, which can be packed into the P2 field of the header without need for payload data.

An example of a program definition (e.g., C++ definition) of a data structure sent as (encoded) payload data in a message of a run_job message type is provided below in TABLE 5.

TABLE 5

```
struct A2B_run_job_t
{
    int uid ;
    int gid ;
    std::vector? int > supplemental_groups ;
    std::vector< std::string > command_tokens ;
    std::map< std::string, std::string > environment ;
    ...
} ;
```

Based on the example program definitions provided in TABLE 2 and TABLE 5, the following example program statement (executed on software agent A 104) could generate a message of the run_job message type to be communicated from software agent A 104 to software agent B 106 over the channel A2B.

auto *m*=Message(*A2B*::runjob,*A2B*_runjob_*t*{ . . . });

According to various embodiments, payload data of a message is optional and can be omitted for certain message types. For instance, a message of an acknowledgment message type may or may not include payload data.

Figure 3:
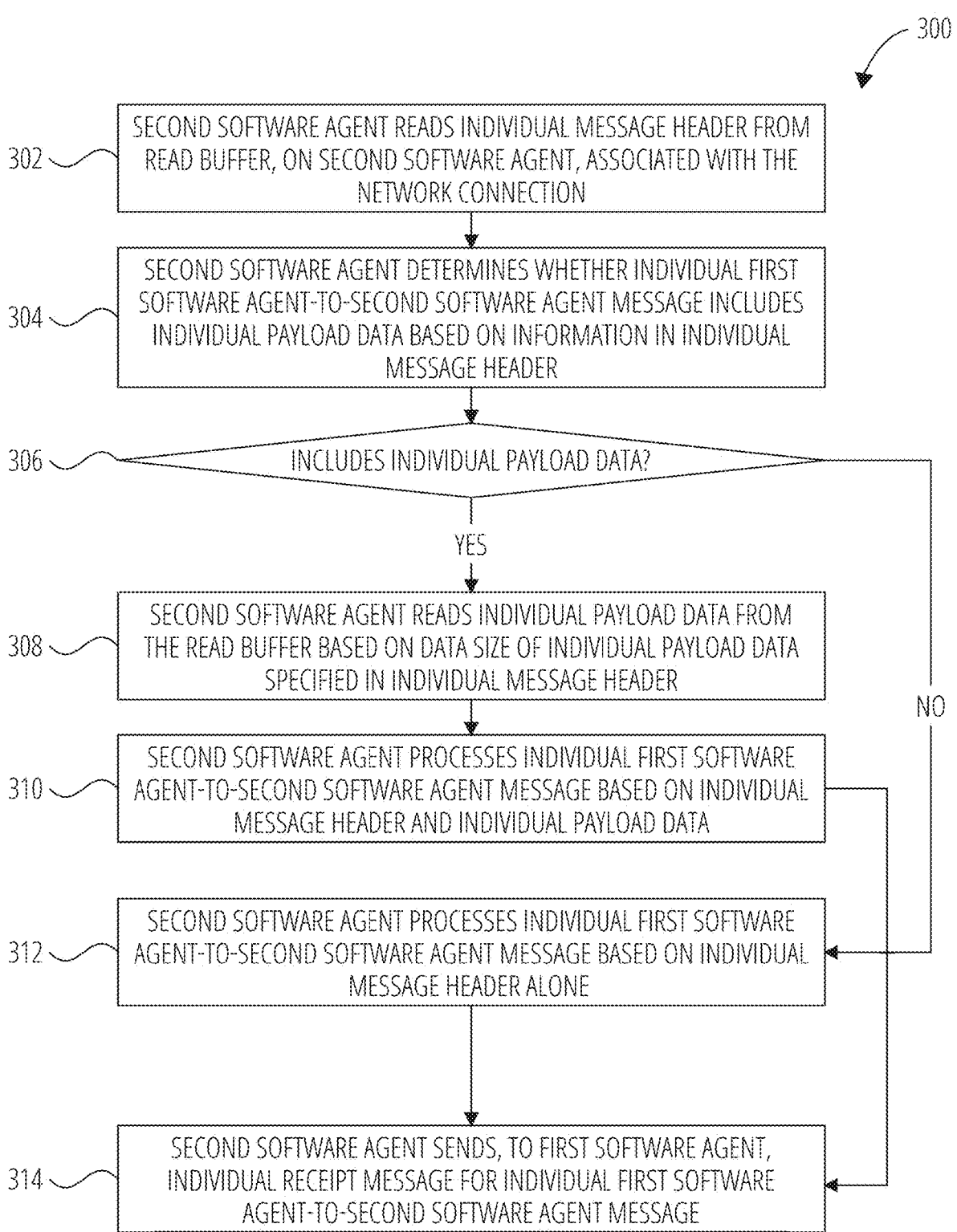

FIG. 2 and FIG. 3 are flowcharts illustrating example methods 200, 300 for application-level data transportation in a distributed computing system, according to some embodiments. It will be understood that example methods described herein can be performed by a device, such as a computing device executing instructions of a software system, in accordance with some embodiments. Additionally, example methods described herein can be implemented in the form of executable instructions stored on a computer-readable medium or in the form of electronic circuitry. For instance, the operations of any one of methods 200, 300 of FIG. 2 through FIG. 3 can be represented by executable instructions that, when executed by a processor of a computing device, cause the computing device to perform the method. Depending on the embodiment, an operation of an example method described herein can be repeated in different ways or involve intervening operations not shown. Though the operations of example methods may be depicted and described in a certain order, the order in which the operations are performed may vary among embodiments, including performing certain operations in parallel. An operation of any of methods 200, 300 (or another method described herein) may be performed by a hardware processor (e.g., central processing unit or graphics processing unit) of a computing device (e.g., desktop, server, etc.). While some aspects of method 200 are described with respect to the distributed computing system 100 of FIG. 1, method 200 can be implemented with respect to distributed computing systems having different configurations.

Referring now to FIG. 2, at operation 202, a first software agent (e.g., software agent A 104) implemented by at least one hardware processor establishes a network connection with a second software agent (e.g., software agent B 106) implemented by at least one hardware processor. For various embodiments, the network connection supports an application-level channel (e.g., A2B or B2A channel of FIG. 1) for communicating (e.g., transporting) one or more application-level messages from the first software agent to the second software agent. According to various embodiments, the first and the second software agents are associated with a distributed software application that is operating on a distributed computing system (e.g., 100). For example, the distributed software application can be a batch software application configured to coordinate and orchestrate execution of a batch job. For some embodiments, the network connection comprises a network socket connection, such as one based on TCP (e.g., a TCP socket connection). The network connection can be bi-directional. For various embodiments, the network connection has a primary direction of information flow (e.g., from the first software agent to the second software agent) that can be used to convey non-acknowledgment messages (e.g., messages with batch instructions) and has a back-flow direction flow (e.g., from the second software agent to the first software agent) that can be used to convey acknowledgment messages or other forms of receipt messages.

For some embodiments, the first software agent is associated with a first agent class that describes at least one of a function or behavior (e.g., batch scheduler, etc.) of the first software agent for the distributed software application, and the second software agent (which can also be implemented by a hardware processor) is associated with a second agent class that describes at least one of a function or behavior (e.g., job controller, etc.) of the second software agent for the distributed software application. The first software agent can represent a first node in a distributed computing system operating the distributed software application, and the second software agent can represent a second node in the distributed computing system. The first agent class and the second agent class can be different classes, or can be the same class. A first network connection and a second network connection can be established between the first and second software agents, where the primary direction of information flow of the first network connection is from the first software agent to the second software agent, and the primary direction of information flow of the second network connection is from the second software agent to the first software agent. Accordingly, the first and the second software agents can be configured to: use the first network connection to send, from the first software agent to the second software agent, first software agent-to-second software agent messages of the distributed software application; use the first network connection to send, from the second software agent to the first software agent, receipt messages for the first software agent-to-second software agent messages; use the second network connection to send second software agent-to-first software agent messages of the distributed software application from the second software agent to the first software agent; and use the second network connection to send, from the first software agent to the second software agent, receipt messages for the second software agent-to-first software agent messages. In this way, the first network connection can support a first channel (e.g., A2B channel of FIG. 1) between the first and the second software agents, and the second connection can support a second, different channel (e.g., B2A channel of FIG. 1) between the first and the second software agents. For purposes of describing method 200 of FIG. 2, the network connection established at operation 202 can represent the first network connection (e.g., that supports an A2B channel).

By operations 204, 206, and 208, the first software agent can send select application data (for the distributed software application) from the first software agent to the second software agent over the network connection (established at operation 202) using an application-level message. For example, the application data can comprise a program data structure of the distributed software application, where the program data structure can be a program variable or a program data object. At operation 204, the first software agent generates an individual first software agent-to-second software agent message, where the individual first software agent-to-second software agent message is carrying the select application data being sent to the second software agent. The individual first software agent-to-second software agent message represents an application-level message (for the distributed software application) being sent from the first software agent to the second software agent.

According to some embodiments, the individual first software agent-to-second software agent message comprises an individual message header and individual payload data.

An example of an application-level message structure of the individual first software agent-to-second software agent message is described in TABLE 1, and an example program definition (e.g., C++ definition) of an application-level message structure of the application-level message structure of the individual first software agent-to-second software agent message is described in TABLE 2. The individual payload data comprises the select application data. For example, the individual payload data can comprise encoded application data that is generated based on the select application data. The select application data can be generated by using an encoding (e.g., serialization) function supported by the first software agent to encode the select application data. Examples of an encoding function used can include, without limitation, a zpp-bits serialization function, a JSON serialization function, a CBOR serialization function, and a protobuf serialization function. The encoding function used would be one for which the second software agent supports a compatible decoding (e.g., deserialization) function to decode the encoded application data.

For various embodiments, the individual message header has a predetermined fixed-data size that is known to the first and the second software agents, and other software agents of the distributed computing system. This can enable each software agent to perform a fixed-length read on a network read buffer to retrieve a message header for an incoming message, and avoid having to search for message header boundaries. Once obtained from the network read buffer, a message header can be delivered to a receiving software agent whether or not an incoming message has payload data and can specify the data size of the payload data if the incoming message contains the payload data. This can enable the receiving software agent to perform one or more reads on the network read buffer to retrieve the payload data, know if and when the complete payload data has been received, and avoid having to search for the payload data boundaries.

For various embodiments, the individual message header comprises: an individual message identifier field; an individual payload indicator field; and an individual payload size field. The individual message identifier field (e.g., ID in TABLE 1) can be set to a value that specifies a message type of the individual first software agent-to-second software agent message. The message type of the individual first software agent-to-second software agent message can be selected from a plurality (e.g., enumeration) of memory types for communication over a channel from software agents of the first agent class to software agents of the second agent class over a network connection (e.g., first agent class-to-second agent class message types). For example, where the network connection is an agent class A-to-agent class B (A2B) channel, the message type of the individual first software agent-to-second software agent message can be selected from an enumeration of memory types defined by the protocol for A2B channels. As described herein, each channel between a communicating pair of agent classes (source, destination) can have a protocol that is defined for the channel, which can define a set (e.g., enumeration) of message types. The protocol can represent a channel type. For some embodiments, the encoding function used to encode the select application data to encoded application data is associated with the message type specified in the individual message header. Additionally, the message type specified in the individual message header can determine how the second software agent will handle the individual first software agent-to-second software agent message when it is received (e.g., what message handler is invoked), can determine whether the second software agent needs to decode data stored in payload data (e.g., the individual payload data), and can determine what decoding function the second software agent uses to decode the encoded data (e.g., the encoded application data) stored in the payload data (e.g., the individual payload data). The individual payload indicator field (e.g., P1 in TABLE 1) can be set to a value that indicates a presence or absence of payload data (e.g., the individual payload data) within the individual first software agent-to-second software agent message. The individual payload size field (e.g., P2 in TABLE 1) can be set to a third value that specifies a data size of the payload data (e.g., data size of individual payload data) within the individual first software agent-to-second software agent message if payload data is present. As described herein, if the individual payload indicator field is set to a value indicating the absence of payload data within the individual first software agent-to-second software agent message, the individual payload size field can be used to store (e.g., carry) other payload data, where the data size of the other payload data is limited to the data size of the individual payload size field.

At operation 206, the first software agent sends the individual first software agent-to-second software agent message from the first software agent to the second software agent over the network connection (e.g., via the A2B channel). For some embodiments, operation 206 comprises writing the individual message header to a write buffer (e.g., network write buffer, such as a network transport write buffer) on the first software agent associated with the network connection, and after writing the individual message header to the write buffer, writing the individual payload data to the write buffer. The writing of the individual message header and the individual payload data to the write buffer can be performed by a single atomic write operation. For example, the write operation used can be a write operation such as writev( ), which can enable the first software agent to write multiple memory segments (e.g., the individual message header and the individual payload data) as a single atomic write operation. By using a single atomic write operation, the first software agent can write the individual message header to the write buffer followed by the individual payload data to the write buffer, which can then be followed by the reading of a read buffer (e.g., a network read buffer associated with the network connection, such as network transport read buffer) to read a receipt message (e.g., acknowledgment message) from the second software agent, collapses to a write-read sequence, which can provide optimal speed of operation (e.g., for TCP connections).

Eventually, at operation 208, the first software agent receives, from the second software agent, an individual receipt message for the individual first software agent-to-second software agent message. For various embodiments, the individual receipt message indicates whether the second software agent successfully received the individual first software agent-to-second software agent message. Additionally, or alternatively, the individual receipt message indicates whether the second software agent successfully decoded the encoded application data contained in the individual payload data. Based on one or more indications included in the receipt message (e.g., not completely received, or decode failed), the first software agent can respond accordingly (e.g., cause the individual first software agent-to-second software agent message to be resent or reencode the select application data and send as a new first software agent-to-second software agent message). Where the distributed software application is a batch software application, the message header of at least one first software agent-to-second software agent message can be set to a first message type associated with at least one of running a job, suspending a job, or killing a job, and the message header of at least one second software agent-to-first software agent message can be set to a second message type associated with an acknowledgment (e.g., an acknowledgment that indicates that the run, suspend, or kill request was received, or that indicates whether the request to run, suspend, or kill a job was successful).

Referring now to FIG. 3, method 300 represents operations the second software agent could perform in response to receiving the individual first software agent-to-second software agent message from the first software agent in accordance with method 200 of FIG. 2.

By operations 302, 304, 308, and 310 the second software agent can receive the individual first software agent-to-second software agent message from the first software agent over the network connection. Operations 312 and 314 can represent the second software agent processing the individual first software agent-to-second software agent message after the individual first software agent-to-second software agent message is received from the first software agent. For some embodiments, the individual message header has a predetermined fixed data size known to the second software agent (and known to the first software agent), thereby permitting the second software agent to read the individual message header, from a read buffer (e.g., a network read buffer associated with the network connection, such as network transport read buffer) on the second software agent that is associated with the network connection, using a fixed-data length read operation. As described herein, this can enable the second software agent to retrieve the individual message header without need to search for a message header boundary.

At operation 302, the second software agent reads the individual message header from a read buffer, on the second software agent, associated with the network connection. For various embodiments, operation 302 comprises performing a fixed-length read on the read buffer based on the predetermined fixed data size.

Thereafter, at operation 304, the second software agent determines whether the individual first software agent-to-second software agent message includes the individual payload data based on information in the individual message header. For some embodiments, this involves the second software agent determines whether the individual payload indicator field (e.g., P1 in TABLE 1) of the individual message header has a value that indicates a presence (or absence) of the individual payload data within the individual first software agent-to-second software agent message. At decision point 306, in response to determining that the individual message header includes the individual payload data, method 300 proceeds to operation 308, otherwise method 300 proceeds to operation 312.

During operation 308, the second software agent reads the individual payload data from the read buffer based on the data size of the individual payload data specified in the individual message header. For example, as described herein, the individual payload size field (e.g., P2 in TABLE 1) of the individual message header can contain a value (e.g., in bytes) that specifies a data size of the individual payload data within the individual first software agent-to-second software agent message. For some embodiments, operation 308 comprises performing one or more read operations on the read buffer based on the data size of the individual payload data specified in the individual message header. The one or more read operations can comprise a single fixed-length read based on the data size of the individual payload data. If a given read ends up short based on the data size of the individual payload data, the second software agent can determine a remaining amount of data to be read (based on the data size of the individual payload data) and initiate another continuation read of the read buffer based on the remaining amount of data. After reading the individual payload data from the read buffer, the individual payload data can be stored on a payload buffer on the second software agent, which can be pre-sized by the second software agent (e.g., based on the data size of the individual payload data specified in the individual message header) prior to (or at the beginning of) operation 308.

After reading the individual payload data from the read buffer (e.g., after the reading is successful and complete), method 300 proceeds to operation 310, where the second software agent processes the individual first software agent-to-second software agent message based on the (received) individual message header and the (received) individual payload data. For some embodiments, operation 310 comprises attempting to decode the encoded application data contained in the individual payload data to generate decoded application data, which can represent a copy of the (original) select application data on the first software agent. For some embodiments, operation 310 comprises the second software agent determining a message handler on the second software agent to handle the individual first software agent-to-second software agent message, and invoking the message handler to handle the individual payload data (e.g., the encoded payload data contained in the individual payload data as-is). Alternatively, for some embodiments, operation 310 comprises the second software agent decoding the encoded application data (contained in the individual payload data) using a decoding function (e.g., decoding function identifier based on the message identifier stored in the individual message header), determining a message handler on the second software agent to handle the individual first software agent-to-second software agent message, and invoking the message handler to handle the decoded application data. The message handler can be determined based on information contained (e.g., stored) in the individual message header, such as the individual message identifier. After operation 310, method 300 proceeds to 314.

During operation 312, the second software agent processes the individual first software agent-to-second software agent message based on the (received) individual message header alone. For some embodiments, operation 314 comprises the second software agent determining a message handler on the second software agent to handle the individual first software agent-to-second software agent message, and invoking the message handler to handle the individual message header. For example, as described herein, where the individual payload indicator field (e.g., P1 in TABLE 1) of the individual message header has a value that indicates the absence of payload data within the individual first software agent-to-second software agent message, the individual payload size field (e.g., P2 in TABLE 1) of the individual message header can be used to store (e.g., carry) other payload data, where the data size of the other payload data is limited to the data size of the individual payload size field. In such cases, the second software agent can determine a message handler on the second software agent to handle the individual first software agent-to-second software agent message, and invoke the message handler to handle the other payload data stored in the individual payload size field. The message handler can be determined based on information contained (e.g., stored) in the individual message header, such as the individual message identifier. After operation 312, method 300 proceeds to 314.

At operation 314, the second software agent sends, to the first software agent, an individual receipt message for the individual first software agent-to-second software agent message. The individual receipt message can serve as an acknowledgment to the first software agent that the second software agent successfully received the individual first software agent-to-second software agent message. For some embodiments, the individual receipt message comprises a select message header comprising a select message identifier field, and a select payload indicator field. The select message identifier field can be set to a value that specifies an acknowledgment message type (e.g., acceptance acknowledgment, rejection acknowledgment); and the select payload indicator field can be set to a value that indicates an absence of payload data within the individual receipt message. For some embodiments, the individual receipt message indicates whether the second software agent successfully processed the individual first software agent-to-second software agent message (e.g., processed at operation 310 or operation 312). For example, where the second software agent attempts to decode encoded application data (e.g., during operation 310) using a decode function, the individual receipt message indicates whether the second software agent successfully decoded the encoded application data. For instance, to indicate the success of the decode, the select message identifier field of the select message header (of the individual receipt message) can be set to a first acknowledgment type that indicates or represents a successful decode of the encoded application data, and to indicate the failure of the decode, the select message identifier field of the select message header (of the individual receipt message) can be set to a second acknowledgment type that indicates or represents a failure to decode the encoded application data. In this way, the acknowledgment message type can indicate whether the second software agent successfully decoded the encoded application data. Alternatively, given that the individual receipt message does not include payload data, a select payload size field of the select message header can be set to a value that indicates whether the second software agent successfully decoded the encoded application data.

Figure 4:
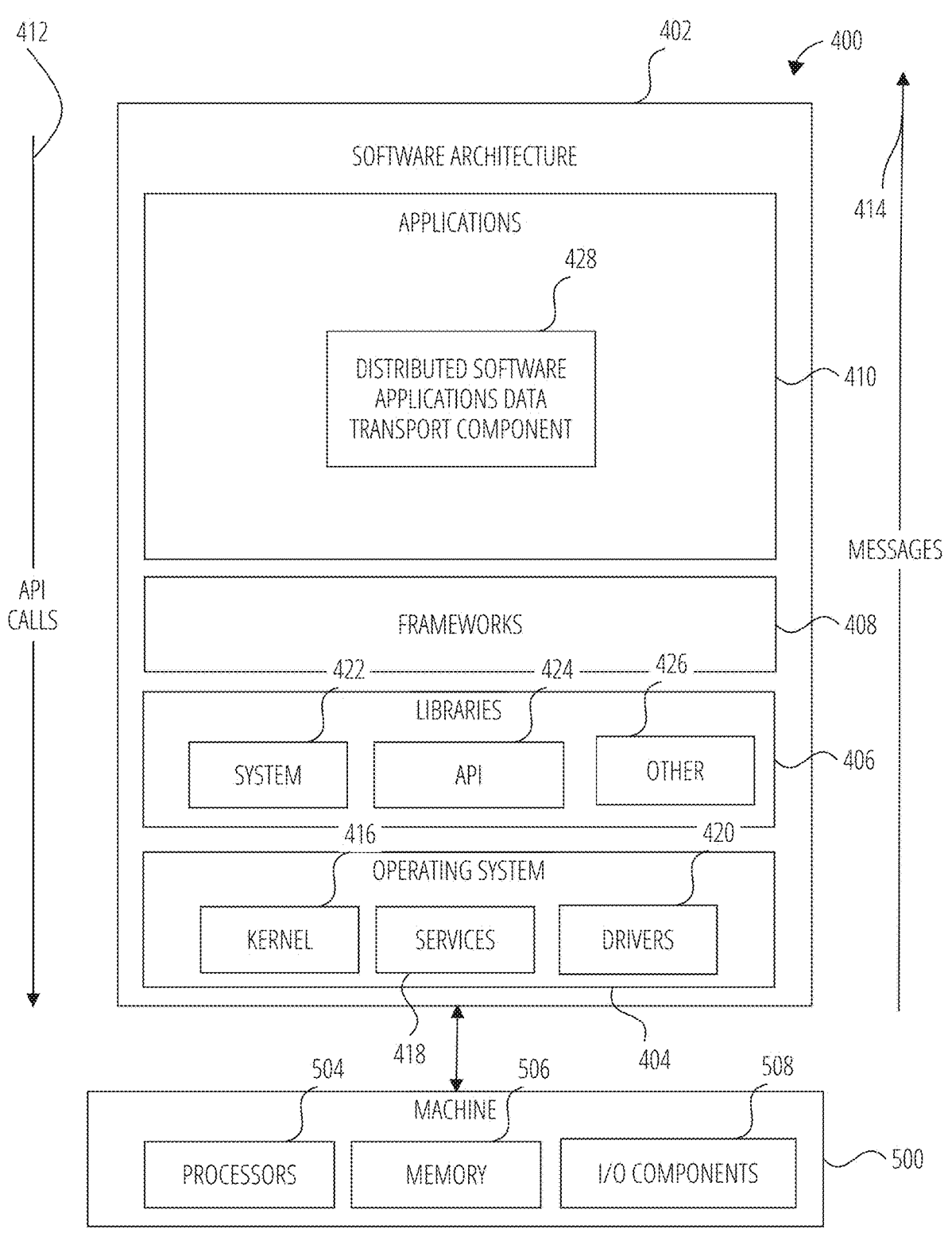
FIG. 4 is a block diagram illustrating an example of a software architecture that may be operating on an electronic design automation (EDA) computing device and may be used with methodologies for application-level data transportation in a distributed computing system, according to some embodiments.

FIG. 4 is a block diagram 400 illustrating merely a non-limiting example of a software architecture 402, which can be installed on any one or more of the devices described herein, and it will be appreciated that many other architectures can be implemented to facilitate the functionality described herein. In various embodiments, the software architecture 402 is implemented by hardware such as a machine 500 that includes processors 504, memory 506, and I/O components 508. In this example, the software architecture 402 can be conceptualized as a stack of layers, where each layer provides a particular functionality. The software architecture 402 includes layers such as an operating system 404, libraries 406, frameworks 408, and applications 410. Operationally, the applications 410 invoke API calls 412 through the software stack and receive messages 414 in response to the API calls 412, consistent with some embodiments. In various embodiments, any client device, any server computer of a server system, or any other device described herein may operate using elements of the software architecture 402.

In some embodiments, a Distributed software applications data transport component 428 of the applications 410 performs operations of application-level data transportation in a distributed computing system according to embodiments described herein using various components within the software architecture 402. For example, in some embodiments, a computing device similar to the machine 500 includes the memory 506 and the one or more processors 504. The processors 504 also implement the Distributed software applications data transport component 428 for application-level data transportation in a distributed computing system in accordance with various embodiments described herein.

In various other embodiments, rather than being implemented as components of the one or more applications 410, the Distributed software applications data transport component 428 may be implemented using elements of the libraries 406, the operating system 404, or the software frameworks 408.

In various implementations, the operating system 404 manages hardware resources and provides common services. The operating system 404 includes, for example, a kernel 416, services 418, and drivers 420. The kernel 416 acts as an abstraction layer between the hardware and the other software layers. For example, the kernel 416 provides memory management, processor management (e.g., scheduling), component management, networking, and security settings, among other functionalities. The services 418 can provide other common services for the other software layers. The drivers 420 are responsible for controlling or interfacing with the underlying hardware. For instance, the drivers 420 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

In some embodiments, the libraries 406 provide a common low-level infrastructure used by the applications 410. The libraries 406 can include system libraries 422 (e.g., C standard library) that provide functions such as memory allocation functions, string manipulation functions, mathematical functions, and the like. In addition, the libraries 406 can include API libraries 424 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 406 can also include a wide variety of other libraries 426 to provide many other APIs to the applications 410.

The frameworks 408 provide a common high-level infrastructure that is used by the applications 410. For example, the frameworks 408 provide various graphical user interface (GUI) functions, high-level resource management, and high-level location services. The frameworks 408 can provide a broad spectrum of other APIs that can be used by the applications 410, some of which may be specific to a particular operating system or platform. In various embodiments, the systems, methods, devices, and instructions described herein may use various files, macros, libraries, and other elements of a distributed computing system or a distributed software application as described herein.

Certain embodiments are described herein as including logic or a number of components, modules, elements, or mechanisms. Such components can constitute either software components (e.g., code embodied on a machine-readable medium or in a transmission signal) or hardware components. A "hardware component" is a tangible unit capable of performing certain operations and can be configured or arranged in a certain physical manner. In various embodiments, one or more computer systems (e.g., a standalone computer system, a client computer system, or a server computer system) or one or more hardware components of a computer system (e.g., a processor or a group of processors) are configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a field-programmable gate array (FPGA) or an application-specific integrated circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Figure 5:
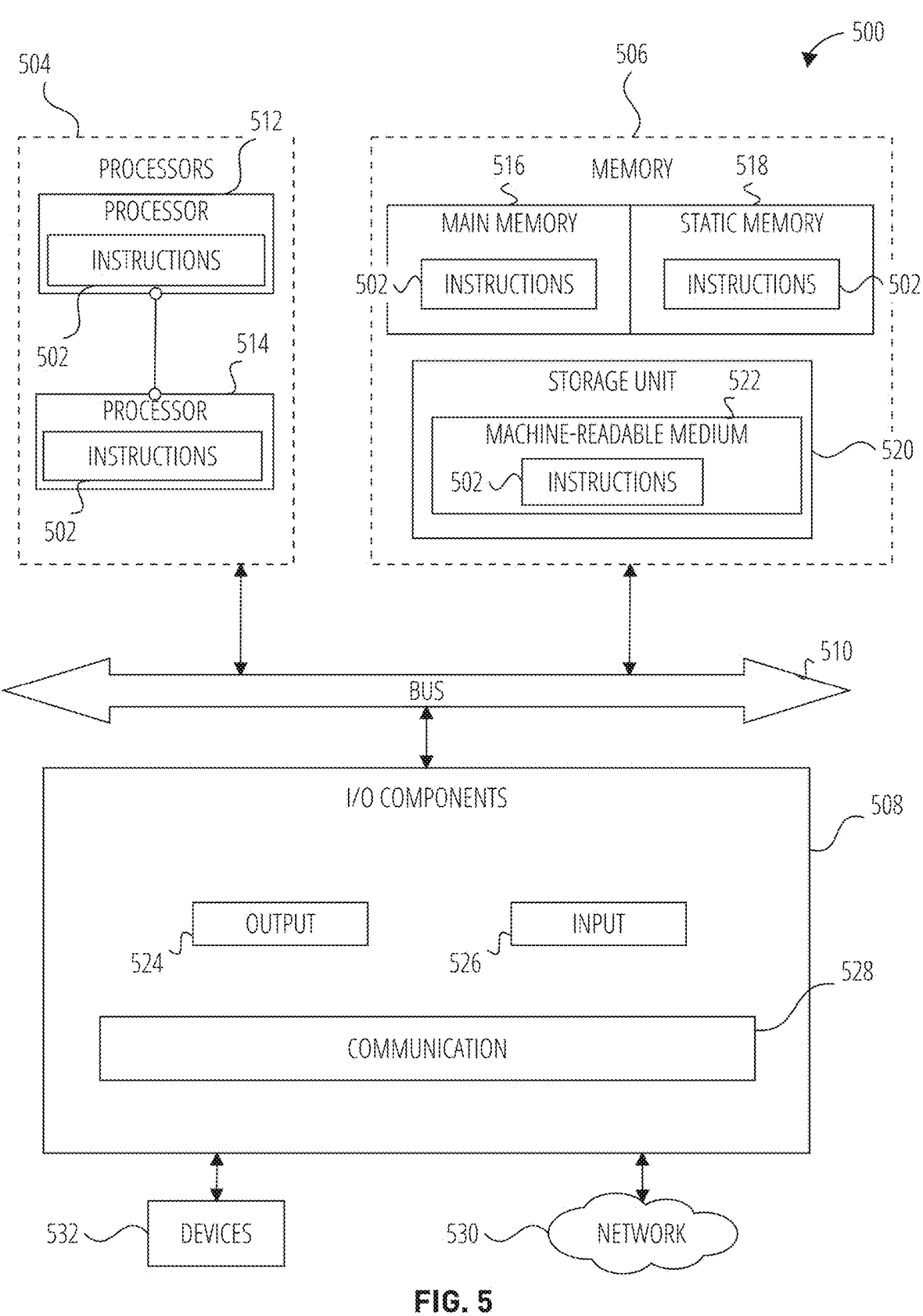
FIG. 5 is a diagrammatic representation of a machine in the form of a computer system within which a set of instructions may be executed to cause the machine to perform any one or more of the methodologies discussed herein, in accordance with some embodiments.

FIG. 5 is a diagrammatic representation of the machine 500 in the form of a computer system within which a set of instructions may be executed to cause the machine 500 to perform any one or more of the methodologies discussed herein, according to some embodiments. FIG. 5 shows components of the machine 500, which is, according to some embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 502 (e.g., software, a program, an application, an applet, an app, or other executable code) cause the machine 500 to perform any one or more of the methodologies discussed herein can be executed. In alternative embodiments, the machine 500 operates as a standalone device or can be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 can comprise, but not be limited to, a server computer, a client computer, a personal computer (PC), a tablet computer, a laptop computer, a netbook, or any machine capable of executing the instructions 502, sequentially or otherwise, that specify actions to be taken by the machine 500. Further, while only a single machine 500 is illustrated, the term "machine" shall also be taken to include a collection of machines 500 that individually or jointly execute the instructions 502 to perform any one or more of the methodologies discussed herein.

In various embodiments, the machine 500 comprises processors 504, memory 506, and I/O components 508, which can be configured to communicate with each other via a bus 510. In some embodiments, the processors 504 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another, or any suitable combination thereof) include, for example, a processor 512 and a processor 514 that may execute the instructions 502. The term "processor" is intended to include multi-core processors that can comprise two or more independent processors 512, 514 (also referred to as "cores") that can execute the instructions 502 contemporaneously. Although FIG. 5 shows multiple processors 504, the machine 500 may include a single processor 512 with a single core, a single processor 512 with multiple cores (e.g., a multi-core processor), multiple processors 504 with a single core, multiple processors 504 with multiple cores, or any combination thereof.

The memory 506 comprises a main memory 516, a static memory 518, and a storage unit 520 accessible to the processors 504 via the bus 510, according to some embodiments. The storage unit 520 can include a machine-readable medium 522 on which are stored the instructions 502 embodying any one or more of the methodologies or functions described herein. The instructions 502 can also reside, completely or at least partially, within the main memory 516, within the static memory 518, within at least one of the processors 504 (e.g., within the processor's cache memory), or any suitable combination thereof, during execution thereof by the machine 500. Accordingly, in various embodiments, the main memory 516, the static memory 518, and the processors 504 are considered machine-readable media machine-readable medium 522.

As used herein, the term "memory" refers to a machine-readable medium 522 able to store data temporarily or permanently and may be taken to include, but not be limited to, random-access memory (RAM), read-only memory (ROM), buffer memory, flash memory, and cache memory. While the machine-readable medium 522 is shown, in some embodiments, to be a single medium, the term "machine-readable medium" should be taken to include a single medium or multiple media (e.g., a centralized or distributed database, or associated caches and servers) able to store the instructions 502. The term "machine-readable medium" shall also be taken to include any medium, or combination of multiple media, that is capable of storing instructions (e.g., the instructions 502) for execution by a machine (e.g., the machine 500), such that the instructions, when executed by one or more processors of the machine (e.g., the processors 504), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 508 include a wide variety of components to receive input, provide output, produce output, transmit information, exchange information, capture measurements, and so on. In general, it will be appreciated that the I/O components 508 can include many other components that are not shown in FIG. 5. The I/O components 508 are grouped according to functionality merely to simplify the following discussion, and the grouping is in no way limiting. In various embodiments, the I/O components 508 include output components 524 and input components 526. The output components 524 include visual components (e.g., a display (or hardware display) such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 526 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

Communication can be implemented using a wide variety of technologies. The I/O components 508 may include communication components 528 operable to couple the machine 500 to a network 530 or devices 532 via respective couplings. For example, the communication components 528 include a network interface component or another suitable device to interface with the network 530. In further examples, the communication components 528 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 532 may be another machine or any of a wide variety of peripheral devices (e.g., a peripheral device coupled via a USB).

In various embodiments, one or more portions of the network 530 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 530 or a portion of the network 530 may include a wireless or cellular network.

Furthermore, the machine-readable medium 522 is non-transitory (in other words, not having any transitory signals) in that it does not embody a propagating signal. However, labeling the machine-readable medium 522 "non-transitory" should not be construed to mean that the machine-readable medium 522 is incapable of movement; the machine-readable medium 522 should be considered as being transportable from one physical location to another. Additionally, since the machine-readable medium 522 is tangible, the machine-readable medium 522 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to some embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A system comprising:
at least one hardware processor;
a first software agent implemented by the least one hardware processor, the first software agent being associated with a first agent class that describes at least one of a function or behavior of the first software agent for a distributed software application;
a second software agent implemented by the least one hardware processor, the second software agent being associated with a second agent class that describes at least one of a function or behavior of the second software agent for the distributed software application;
a first network connection established between the first and second software agents; and
a second network connection established between the first and second software agents, the first and second software agents being configured to:
use the first network connection to send, from the first software agent to the second software agent, first software agent-to-second software agent messages of the distributed software application;
use the first network connection to send, from the second software agent to the first software agent, receipt messages for the first software agent-to-second software agent messages;
use the second network connection to send second software agent-to-first software agent messages of the distributed software application from the second software agent to the first software agent; and
use the second network connection to send, from the first software agent to the second software agent, receipt messages for the second software agent-to-first software agent messages.

2. The system of claim 1, wherein the first software agent is configured to send select application data from the first software agent to the second software agent by:
generating an individual first software agent-to-second software agent message that comprises:
individual payload data comprising encoded application data generated based on the select application data; and
an individual message header comprising:
an individual message identifier field set to a first value that specifies a message type of the individual first software agent-to-second software agent message;
an individual payload indicator field set to a second value that indicates a presence of the individual payload data within the individual first software agent-to-second software agent message; and
an individual payload size field set to a third value that specifies a data size of the individual payload data; and
sending the individual first software agent-to-second software agent message from the first software agent to the second software agent over the first network connection.

3. The system of claim 2, wherein the sending of the individual first software agent-to-second software agent message from the first software agent to the second software agent over the first network connection comprises:
writing the individual message header to a write buffer on the first software agent associated with the first network connection; and
after writing the individual message header to the write buffer, writing the individual payload data to the write buffer.

4. The system of claim 3, wherein the writing the individual message header to the write buffer and the writing of the individual payload data to the write buffer is performed by a single atomic write operation.

5. The system of claim 3, wherein the second software agent is configured to receive the select application data from the first software agent by:
receiving the individual first software agent-to-second software agent message from the first software agent over the first network connection, the individual message header having a predetermined fixed data size known to the second software agent, the receiving of the individual first software agent-to-second software agent message comprising:

reading the individual message header from a read buffer on the second software agent associated with the first network connection by performing a fixed-length read on the read buffer based on the predetermined fixed data size; and after the reading of the individual message header from the read buffer:

determining whether the individual first software agent-to-second software agent message includes the individual payload data based on information in the individual message header; and in response to determining that the individual message header includes the individual payload data, reading the individual payload data from the read buffer by performing one or more read operations on the read buffer based on the data size of the individual payload data specified in the individual message header.

6. The system of claim 5, wherein the receiving of the individual first software agent-to-second software agent message comprises:

after the reading of the individual payload data from the read buffer:

determining a message handler on the second software agent to handle the individual first software agent-to-second software agent message; and invoking the message handler to handle the encoded application data contained in the individual payload data.

7. The system of claim 5, wherein the receiving of the individual first software agent-to-second software agent message comprises:

after the reading of the individual payload data from the read buffer, attempting to decode the encoded application data contained in the individual payload data; and sending, to the first software agent, an individual receipt message for the individual first software agent-to-second software agent message, the individual receipt message indicating whether the second software agent successfully decoded the encoded application data.

8. The system of claim 7, wherein the individual receipt message comprises:

a select message header comprising:

a select message identifier field set to a fourth value that specifies an acknowledgment message type; and a select payload indicator field set to a fifth value that indicates an absence of payload data within the individual receipt message.

9. The system of claim 8, wherein the acknowledgment message type indicates whether the second software agent successfully decoded the encoded application data.

10. The system of claim 8, wherein the individual receipt message comprises:

a select payload size field set to a sixth value that indicates whether the second software agent successfully decoded the encoded application data.

11. The system of claim 2, the first software agent is configured to send select application data from the first software agent to the second software agent by:

receiving, from the second software agent, an individual receipt message for the individual first software agent-to-second software agent message, the individual receipt message indicating whether the second software agent successfully decoded the encoded application data contained in the individual payload data.

12. The system of claim 1, wherein each first software agent-to-second software agent message has a message type selected from a plurality of first agent class-to-second agent class message types, and each second software agent-to-first software agent message has a message type selected from a plurality of second agent class-to-first agent class message types.

13. The system of claim 1, wherein the first network connection comprises a first Transport Control Protocol (TCP) socket connection, and the second network connection comprises a second Transport Control Protocol (TCP) socket connection.

14. The system of claim 2, wherein the select application data comprises a program data structure of the distributed software application.

15. The system of claim 1, wherein the distributed software application is configured to coordinate and orchestrate execution of a batch job.

16. The system of claim 15, wherein the first agent class is associated with a batch scheduler service, and wherein the second agent class is associated with a job control service.

17. The system of claim 16, wherein a message header of at least one first software agent-to-second software agent message is set to a first message type associated with at least one of running a job, suspending a job, or killing a job, and wherein a message header of at least one second software agent-to-first software agent message is set to a second message type associated with an acknowledgment.

18. A non-transitory computer-readable medium comprising instructions, when executed by a hardware processor of a device, cause a first software agent implemented on the device to perform operations comprising:

generating an individual message to send select application data to second software agent, the individual message comprising:

individual payload data comprising encoded application data generated based on the select application data; and an individual message header comprising:

an individual message identifier field set to a first value that specifies a message type of the individual message;

an individual payload indicator field set to a second value that indicates a presence of the individual payload data within the individual message; and an individual payload size field set to a third value that specifies a data size of the individual payload data; and sending the individual message from the first software agent to the second software agent over a network connection established between the first and the second software agents.

19. The non-transitory computer-readable medium of claim 18, wherein the select application data comprises a program data structure of a distributed software application.

20. A method comprising:

generating, at a first software agent implemented by one or more hardware processors, an individual message to send select application data to second software agent, the individual message comprising:

individual payload data comprising encoded application data generated based on the select application data; and an individual message header comprising:

an individual message identifier field set to a first value that specifies a message type of the individual message;

an individual payload indicator field set to a second value that indicates a presence of the individual payload data within the individual message; and an individual payload size field set to a third value that specifies a data size of the individual payload data; and sending the individual message from the first software agent to the second software agent over a network connection established between the first and the second software agents.

\* \* \* \* \*